United States Patent [19]

Van Ruyven

[11] Patent Number: 4,645,915

[45] Date of Patent: Feb. 24, 1987

[54] BAR CODE READER

[75] Inventor: Lodewijk J. Van Ruyven, Eindhoven, Netherlands

[73] Assignee: U.S. Philips Corporation, New York, N.Y.

[21] Appl. No.: 649,635

[22] Filed: Sep. 12, 1984

[30] Foreign Application Priority Data

Sep. 14, 1983 [NL] Netherlands .......................... 8303168

[51] Int. Cl.⁴ .............................................. G06K 7/10
[52] U.S. Cl. .................................... 235/473; 235/472; 250/568; 372/6; 372/43
[58] Field of Search ............... 372/6, 43, 42; 235/472, 235/473; 250/568

[56] References Cited

U.S. PATENT DOCUMENTS

| | | | |
|---|---|---|---|
| 3,355,674 | 11/1967 | Hardy | 372/6 X |
| 3,761,837 | 9/1973 | Leheny et al. | 372/43 |
| 4,286,142 | 8/1981 | Palmer | 235/473 X |
| 4,467,196 | 8/1984 | Balliet et al. | 235/472 X |

Primary Examiner—David L. Trafton
Attorney, Agent, or Firm—Marc D. Schechter

[57] ABSTRACT

A bar code reader comprises a semiconductor laser diode. A first end face of the laser diode is optically coupled to an end of an optical fiber. A second end face of the laser diode is optically coupled to a detector. The bar code is scanned at the free end of the optical fiber. This information is read by the semiconductor laser diode by way of optical feedback.

6 Claims, 2 Drawing Figures

BAR CODE READER

BACKGROUND OF THE INVENTION

The invention relates to a bar code reading device. The bar code reader comprises a semiconductor laser diode having a first end face. The first end face is optically coupled to an end of a section of an optical waveguide in order to scan the bar code provided on an object. The bar code reader also comprises a detector for detecting the radiation reflected by the bar code.

A device of this kind is described in U.S. Pat. No. 4,286,145. The light produced by the semiconductor laser diode is coupled into an optical waveguide. The light is used to read the bar code provided on a surface of an object, for example a retail sales item. During reading, the light is either reflected or not, depending on the pattern of the bar code information. The reflected light is coupled into the optical waveguide, separated by a directional coupler, and received by the detector. The detector detects the content of the bar code from the reflected light and converts this information into a binary electrical signal which is input to a data processing system.

Devices of this kind are usually used in retail sales outlets. This is because most retail sales items are provided with a UPC (Universal Product Code) bar code, enabling operations such as totaling sales prices, recording inventories, etc. to be more efficiently performed.

It is a drawback of the known device, however, that a directional coupler is used for separating the transmitted radiation and the reflected radiation. Such a directional coupler is expensive and absorbs a part of the energy of the reflected light. Because only the reflected light contains the information read, this loss of energy means that the energy of the transmitted light must be high. For use in sales outlets, safety regulations limit the maximum energy permissible.

SUMMARY OF THE INVENTION

It is an object of the invention to provide a bar code reader in which a directional coupler is not needed.

To this end, a bar code reader according to the invention comprises a semiconductor laser diode having a second end face. The second end face is optically coupled to the detector for detection via incoherent optical feedback by the semiconductor laser diode and the optical waveguide. Because the second end face of the semiconductor laser diode is optically coupled to the detector, detection is possible via feedback. Consequently, a directional coupler is no longer required. Moreover, because the fed back light increases the energy of the laser, the energy of the transmitted light need not be so high. The total dissipated energy then remains small, so that small power supply currents can be used for the laser.

In a device according to the invention, the semiconductor laser diode preferably produces light whose wavelength exceeds 1.3 $\mu$m. Light whose wavelength exceeds 1.3 $\mu$m is completely harmless to the human eye, because radiation having this wavelength is absorbed by water.

Preferably, a device according to the invention utilizes an InGaAsP diode laser. This laser produces light having a wavelength of between 1.3 and 1.5 $\mu$m.

DESCRIPTION OF THE PREFERRED EMBODIMENTS

Figure 1:
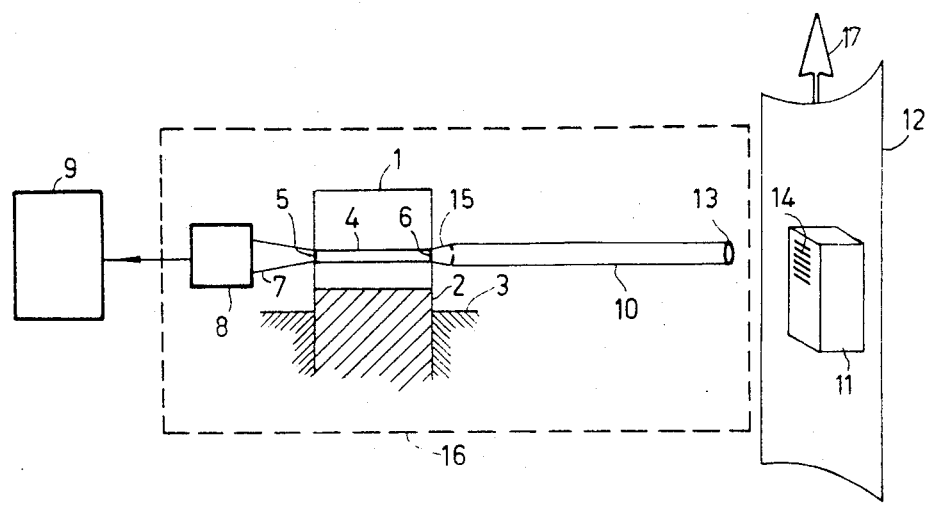
FIG. 1 schematically shows an embodiment of a bar code reader according to the invention.

FIG. 1 shows an embodiment of a bar code reader according to the invention. The device 16 comprises a semiconductor laser diode 1 which is mounted on a cooling block 2. Cooling block 2 is secured in a holder 3.

The active layer 4 of the laser is situated between reflective end faces 5 and 6 which form the laser resonator. The end faces 5 and 6 are partly transparent mirrors which transmit a part of the incident light.

The light transmitted by the end face 5 is coupled to the input of a detector 8 via an optical coupling 7. The detector, for example a photodetector which converts an optical signal into an electrical signal, has an output which is connected to an input of a data processing system 9 to be connected to the device 16.

Via an optical coupling 15, the end face 6 of the laser is coupled to an end of a section of an optical fiber 10. This optical fiber 10 and the laser 1 form a rigid unit because, as will be described in detail below, the bar code is read by optical feedback. If this were not a rigid unit, movement of this optical coupling 15 would couple a signal into the laser 1 which has not been reflected by the bar code, thus causing an incorrect signal.

The other (free) end of the optical fiber 10 is bounded by an optical element 13, preferably a lens. The latter, however, is merely a preferred embodiment. Instead of being bounded by an optical element, the free end of fiber 10 may be the end face of the fiber.

A conveyor belt 12 carries an item 11 which is provided with a bar code 14 in the form of reflective strips. The conveyer belt moves in the direction indicated by the arrow 17. The side of the item 11 on which the bar code is provided faces the free end of the optical fiber 10 or the optical element 13. Due to this arrangement, the bar code is transported in front of the optical fiber 10 so that it can be read by the device 16.

Preferably, the optical element 13 is arranged so as to be substantially parallel to the surface of the item on which the bar code is provided. The distance between the latter surface and the optical element is preferably small. The light transported by the optical fiber is then directed perpendicular to the surface on which the bar code is provided.

This perpendicular orientation is important mainly when a linear bar code is used. It is less important when an annular bar code pattern is used. When a linear pattern is used, the optical element must not be directed perpendicular to the surface on which the bar code is provided, because reading is then impossible.

Bar code information provided on an item which is transported past the device 16 on the conveyer belt is read by feedback. The light emitted by the laser 1 emerges via the end face 6 in order to be coupled into the optical fiber 10. The light transported by the optical fiber is reflected by the bar pattern of the bar code. The reflected light is detected by the laser itself. This is because the reflected light is imaged on the end face 6 of the laser. The semiconductor laser diode 1 responds to variations of the light reflected by the bar code by causing variations of the power emitted at the end face 5 of the laser 1. These laser output variations are detected by the detector 8.

Figure 2:
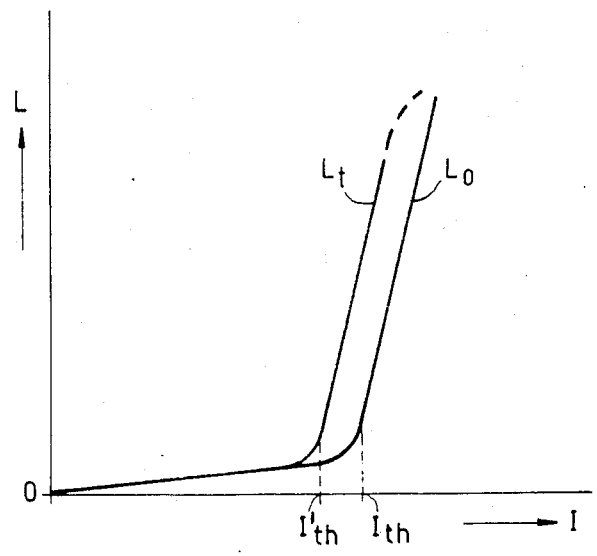
FIG. 2 is a graph of the luminous flux output of a semiconductor laser diode as a function of the forward current through the laser diode.

The laser output variations, being caused by a feedback of the reflected light, result from a shift of the luminous flux characteristic of the laser. Such a characteristic is illustrated in FIG. 2 in which the power (L) of the emitted radiation is plotted as a function of the current (I) through the laser diode in the forward direction.

The graph $L_0$ shows the L-I characteristic without feedback. When the current intensity exceeds a value $I_{th}$, referred to as the threshold current, lasing occurs. With feedback, graph $L_f$, this threshold current is shifted to a lower value $I'_{th}$. For a given current intensity, more power is output from the laser with feedback than without feedback.

It does not matter that the reflected light is incoherent with the light produced by the laser. This is because the reflected light has the same wavelength as the laser light because it is light originating from the laser which is reflected by the bar code.

Depending on the content of the bar code information, therefore, light will be coupled back into the laser or not. Fed back light will cause increased laser power for a given input current. The detector 8 will detect this power increase and will generate an electrical signal therefrom which is input to the data processing system 9 in the form of binary information. The electrical signal is processed by the data processing system in a conventional manner.

It is important that the light propagate in only one mode in the fiber 10. If multiple modes are permitted to propagate, phase fluctuations may occur in the reflected light transmitted by the fiber 10 to the laser. The phase fluctuations may cause additional noise in the optical output of the laser diode.

The laser, an InGaAsP diode laser, emits light having a wavelength in the range of from 1.3 to 1.5 μm. In a Point of Sales (POS) environment in which this device is used, light having such a wavelength is particularly attractive because it is not harmful to the human eye. This is because light having this wavelength is absorbed by water.

Because the optical fiber and the laser form one unit, the device 16 can be included in a closed system so that ambient light cannot interfere with the operation of the device.

In an embodiment which differs from that described with reference to FIG. 1, the device 16 is completely or partly included in, for example, a light pen. In that case, it is no longer necessary to transport the item 11, because the light pen is moved across the bar code.

The detection of reflected light by detecting the power of the light produced by the laser for a given input current represents only one method of reading a bar code by a device according to the invention. It is alternatively possible to detect the noise induced in the laser by the reflected light for detecting the reflected light. Because the bar code is read by optical feedback into the laser, a light ray reflected by the bar code will induce a given amount of noise in the laser. The bar code can be read by measuring the amount of induced noise.

What is claimed is:

1. A bar code reader comprising:
   a semiconductor laser diode having first and second opposite end faces, said laser diode emitting light from the end faces;
   an optical waveguide having a first end optically coupled to the first end face of the laser diode; and
   a detector for detecting light from the laser diode, said detector having an input optically coupled to the second end face of the laser diode.

2. A bar code reader as claimed in claim 1, characterized in that the laser diode emits light having a wavelength greater than 1.3 microns.

3. A bar code reader as claimed in claim 2, characterized in that the laser diode is an InGaAsP diode.

4. A bar code reader as claimed in claim 3, characterized in that the reader is incorporated in a cash register.

5. A bar code reader as claimed in claim 3, characterized in that the reader is at least partially accommodated in a light pen.

6. A bar code reader as claimed in claim 1, characterized in that the end faces of the laser diode are partly transparent mirrors which form a laser resonator.

* * * * *